(12) United States Patent
Wang (10) Patent No.: US 9,483,637 B2
(45) Date of Patent: Nov. 1, 2016

(54) PROGRAM EXECUTION INTEGRITY VERIFICATION FOR A COMPUTER SYSTEM

(71) Applicant: George Mason Research Foudation, Inc., Fairfax, VA (US)

(72) Inventor: Xinyuan Wang, Clifton, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 0 days.

(21) Appl. No.: 14/324,932

(22) Filed: Jul. 7, 2014

(65) Prior Publication Data

US 2015/0007266 A1    Jan. 1, 2015

Related U.S. Application Data

(62) Division of application No. 13/278,814, filed on Oct. 21, 2011, now Pat. No. 8,806,640.

(60) Provisional application No. 61/405,663, filed on Oct. 22, 2010.

(51) Int. Cl.
*G06F 21/51* (2013.01)
*G06F 21/54* (2013.01)

(52) U.S. Cl.
CPC .............. *G06F 21/51* (2013.01); *G06F 21/54* (2013.01)

(58) Field of Classification Search
CPC ......... G06F 21/51; G06F 21/50; G06F 21/52
USPC ................................ 726/24, 26, 22; 713/176
See application file for complete search history.

(56) References Cited

U.S. PATENT DOCUMENTS

| | | |
|---|---|---|
| 2003/0135744 A1 | 7/2003 | Almeida |
| 2008/0060077 A1 | 3/2008 | Cowan |
| 2009/0007100 A1 | 1/2009 | Field et al. |

OTHER PUBLICATIONS

Yuqun Chen et al., "Oblivious Hashing: A Stealthy Software Integrity Verification Primitive", Lecture Notes in Computer Science, vol. 2578, pp. 400-414 (2003).
Zinyuan Wang et al., "Artificial Malware Immunization Based on Dynamically Assigned Sense of Self", TechRepublic.com, Sep. 2010 (16 pages).
Martin Abadi et al., "Control-Flow Integrity: Principles, Implementations, and Applications", In Proceedings of the 12th ACM Conference on Computer and Communications Security (CCS 2005), pp. 340-353, Nov. 2005.
Elias Bachaalany, "Detect if Your Program is Running Inside a Virtual Machine", http://www.codeproject.com/system/vmdetect. asp, Apr. 4, 2005 (6 pages).

(Continued)

*Primary Examiner* — Brian Shaw
(74) *Attorney, Agent, or Firm* — Eckert Seamans Cherin & Mellott, LLC; Nathaniel C. Wilks (57) ABSTRACT

A computer system may be employed to verify program execution integrity by receiving a request to launch a program that has been instrumented to include at least one integrity marker, instantiating the program with an integrity marker value, and verifying the execution integrity of the program based on the integrity marker value and information received from the program during execution. A computer system may also be employed for program instrumentation by modifying the program to include at least one instruction for passing an integrity marker value to an operating system kernel during execution of the instruction.

8 Claims, 9 Drawing Sheets

(56) References Cited

OTHER PUBLICATIONS

"ghttped Daemon Buffer Overflow Vulnerability", http://securityfocus.com/bid/2879, Published Jun. 17, 2001, updated Jul. 11, 2009 (5 pages).
"Snort/Sourcefire DCE/RPC Packet Reassembly Stack Buffer Overflow Vulnerability", http://www.securityfocus.com/bid/22616, Published Feb. 19, 2007, updated Nov. 15, 2007 (5 pages).
Alexey Smirnov et al., "Automatic Detection, Identification, and Repair of Control-Hijacking Attacks", In Proceedings of the 12th Network and Distributed System Security Symposium (NDSS 2005), Feb. 2005 (19 pages).
Elena Barrantes et al., "Randomized Instruction Set Emulation", ACM Transactions on Information and System Security, vol. 8, No. 1, pp. 3-40, Feb. 2005.
Elena Barrantes et al., "Radomized Instruction Set Emulation to Disrupt Binary Code Injection Attacks", In Proceedings of the 10th ACM Conference on Computer and Communications Security (CCS'03), pp. 281-289, Oct. 2003.
Sandeep Bhatkar et al., "Dataflow Anomaly Detection", In Proceedings of the 2006 IEEE Symposium on Securiytand Privacy (S&P 2006), May 2006 (15 pages).
Miguel Castro et al., "Secuirty Software by Enforcing Data-Flow Integrity", OSDI'06: 7th USENIX Symposium on Operating Systems Design and Implementation, pp. 147-160, Nov. 2006.
Shuo Chen et al., "Defeating Memory Corruption Attacks via Pointer Taintedness Detection", In Proceedings on the 2005 International Conference on Dependable Systems and Networks (DSN 2005), Jun. 2005 (10 pages).
Shuo Chen et al, "Non-Control-Data Attacks are Realistic Threats", 14th USENIX Security Symposium, pp. 177-191, Aug. 2005.
Xu Chen et al., "Towards an Understanding of Anti-Virtualization and Anti-Debugging Behavior in Modern Malware", In Proceedings of the 2008 International Conference on Dependable Systems and Networks (DSN 2008). IEEE, Jun. 2008 (10 pages).
David M. Chess et al. "An Undetectable Computer Virus", In 2000 Virus Bulletin Conference, Sep. 2000 (8 pages).
Fred Cohen, "Computer Viruses: Theory and Experiments", Computers and Security, vol. 6, No. 1, pp. 22-35, Feb. 1987.
Crispan Cowan et al., "StackGuard: Automatic Adaptive Detection and Prevention of Buffer-Overflow Attacks", In Proceedings of the 7th USENIX Security Symposium, pp. 63-78, Jan. 26-29, 1998.
Henry H. Feng et al., "Anomaly Detection Using Call Stack Information", In Proceedings of the 2003 IEEE Symposium on Security and Privacy (S&P 2003). IEEE, May 2003 (14 pages).
Stephanie Forrest et al., "Computer Immunology", Communications of the ACM, vol. 40, No. 10, pp. 88-96, Oct. 1997.
Stephanie Forrest et al., "A Sense of Self for Unix Processes", In Proceedings of the 1996 IEEE Symposium on Security and Privacy (S&P 1996), pp. 120-128, May 1996.
Mike Frantzen et al., "StackGhost: Hardware Facilitated Stack Protection", In Proceedings of the 10th USENIX Security Symposium, pp. 55-66, Aug. 2001.
Jonathon T. Giffin et al., "Environment-Sensitive Intrusion Detection", In Proceedings of the 8th International Symposium on Recent Advances in Intrusion Detection (RAID 2005), Sep. 2005 (22 pages).
Rajeev Gopalakrishna et al., "Efficient Intrusion Detection Using Automaton Inlining", In Proceedings of the 2005 IEEE Symposium on Security and Privacy (S&P 2005), pp. 18-31, May 2005.
Mohan Rajagopalan et al., "System Call Monitoring Using Authenticated System Calls", IEEE Transactions on Dependable and Secure Computing, vol. 3, No. 3, pp. 216-229, Jul. 2006.
Jun Xu et al., "Transparent Runtime Randomization for Security", In Proceedings of the 22nd Symposium on Reliable and Distributed Systems (SRDS 2003), pp. 260-269, Oct. 2003.
Gaurav S. Kc et al., "Countering Code-Injection Attacks with Instruction-Set Randomization", In Proceedings of the 10th ACM Conference on Computer and Communications Security (CCS 2003), pp. 272-280, Oct. 2003.

Vladimir Kiriansky et al., "Secure Execution via Program Shepherding", In Proceedings of the 11th USENIX Security Symposium, pp. 191-206, Aug. 2002.
C. M. Linn et al., "Protecting against Unexpected System Calls", In Proceedings of the 14th USENIX Security Symposium, pp. 239-254, Aug. 2005.
Danny Nebenzahl et al., "Install-Time Vaccination of Windows Executables to Defend against Stack Smashing Attacks", IEEE Transactions on Dependable and Secure Computing (TDSC), vol. 3m No. 1, pp. 78-90, Jan.-Mar. 2006.
James Newsome et al., "Dynamic Taint Analysis for Automatic Detection, Analysis, and Signature Generation of Exploits on Commodity Software", In Proceedings of the 12th Network and Distributed System Security Symposium (NDSS 2005), Feb. 2005 (17 pages).
Roberto Perdisci et al., "Misleading Worm Signature Generators Using Deliberate Noise Injection", In Proceedings of the 2006 IEEE Symposium on Security and Privacy (S&P 2006), May 2006 (17 pages).
Nick L. Petroni et al., "Automated Detection of Persistent Kernel Control-Flow Attacks", In Proceedings of the 17th ACM Conference on Computer and Communications Security (CCS 2007), pp. 103-115, Oct. 2007.
Mohan Rajagopalan et al., "Authenticated System Calls", In Proceedings of the 2005 International Conference on Dependable Systems and Networks (DSN'05), Jun. 2005 (10 pages).
Sandeep Bhatkar et al., "Efficient Techniques for Comprehensive Protection from Memory Error Exploits", In Proceedings of the 14th USENIX Security Symposium, pp. 255-270, Aug. 2005.
Prateek Saxena et al., "Efficient Fine-Grained Binary Instrumentation with Applications to Taint-Tracking", In Proceedings of the 2008 International Symposium on Code Generation and Optimization (CGO'08), Apr. 5, 2008 (10 pages).
R. Sekar et al., "A Fast Automaton-Based Method for Detecting Anomalous Program Behaviors", In Proceedings of the 2001 IEEE Symposium on Security and Privacy (S&P 2001), pp. 144-155, May 2001.
R. Sekar et al., "Model-Carrying Code: A Practical Approach for Safe Execution of Untrusted Applications", In Proceedings of the 19th ACM Symposium on Operating Systems Principles (SOSP'03), pp. 15-28, Oct. 2003.
Hovav Shacham, et al., "The Geometry of Innocent Flesh on the Bone: Return-into-libc without Function Calls (on the x86)", In Proceedings of the 14th ACM Conference on Computer and Communications Security (CCS'07), pp. 552-561, Oct. 2007.
Florian Nentwich et al., "Cross Site Scripting Prevention with Dynamic Data Tainting and Static Analysis", In Proceedings of the 14th Network and Distributed System Security Symposium (NDSS'07), Feb. 2007 (14 pages).
David Wagner et al., "Intrusion Detection via Static Analysis", In Proceedings of the 2001 IEEE Symposium on Security and Privacy (S&P 2001), May 2001 (13 pages).
David Wagner et al., "Mimicry Attacks on Host-Based Intrusion Detection Systems", In Proceedings of the 9th ACM Conference on Computer and Communications Security (CCS'02), Oct. 2002 (10 pages).
XiaoFeng Wang et al., "Packet Vaccine: Black-box Exploit Detection and Signature Generation", In Proceedings of the 13th ACM Conference on Computer and Communications Security (CCS'06), pp. 37-46, Oct. 2006.
Christina Warrender et al., "Detecting Intrusions Using System Calls: Alternative Data Models", In Proceedings of the 1999 IEEE Symposium on Security and Privacy (S&P 1999), pp. 133-145, May 1999.
John Wilander et al., "A Comparison of Publicly Available Tools for Dynamic Buffer Overflow Prevention", In Proceedings of the 10th Network and Distributed System Security Symposium (NDSS 2003), Feb. 2003 (16 pages).
Wei Xu et al., "Taint-Enhanced Policy Enforcement: A Practical Approach to Defeat a Wide Range of Attacks", In Proceedings of the 15th USENIX Security Symposium, Aug. 2006 (20 pages).
F.M. Burnet, "Self and Not-Self", Cambridge University Press, Cambridge, 1969 (7 pages).

(56) References Cited

OTHER PUBLICATIONS

J. Klein, "Immunology: The Science of Self-Nonself Discrimination", John Wiley & Sons, New York, 1982 (19 pages).

Love (2005). Linux Kernel Development Second Edition. Retrieved Mar. 22, 2014 from http://www.makelinux.net/books/lkd2l?u=app02. Relevant Sections: Chapter 5-System Calls and Appendix B—Kernel Random No. Generator.

Image File Wrapper of Related U.S. Appl. No. 13/278,814 from PAIR on Sep. 22, 2014.

PROGRAM EXECUTION INTEGRITY VERIFICATION FOR A COMPUTER SYSTEM

CROSS-REFERENCE TO RELATED APPLICATIONS

This application is a divisional of U.S. application Ser. No. 13/278,814, filed Oct. 21, 2011. U.S. application Ser. No. 13/278,814 claims the benefit of U.S. Provisional Application No. 61/405,663, filed on Oct. 22, 2010, entitled "Malware Immunization", both of which are hereby incorporated by reference in their entireties.

This invention was made with government support under grant number CNS-0845042 funded by the National Science Foundation. The government has certain rights to this invention.

DETAILED DESCRIPTION OF EMBODIMENTS

Various embodiments of the present invention are directed to the verification of program execution integrity to protect against malware. Example embodiments are described below with reference to the drawings, wherein like reference numerals are used to refer to like elements throughout. The term "embodiments of the invention" does not require that all embodiments of the invention include the discussed feature or mode of operation. Alternate embodiments may be devised without departing from the scope of the invention, and well-known elements of the invention may not be described in detail or may be omitted so as not to obscure the relevant details.

In addition, the terminology used herein is for the purpose of describing particular embodiments only and is not intended to be limiting of the invention. For example, as used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

System Overview

Figure 1:
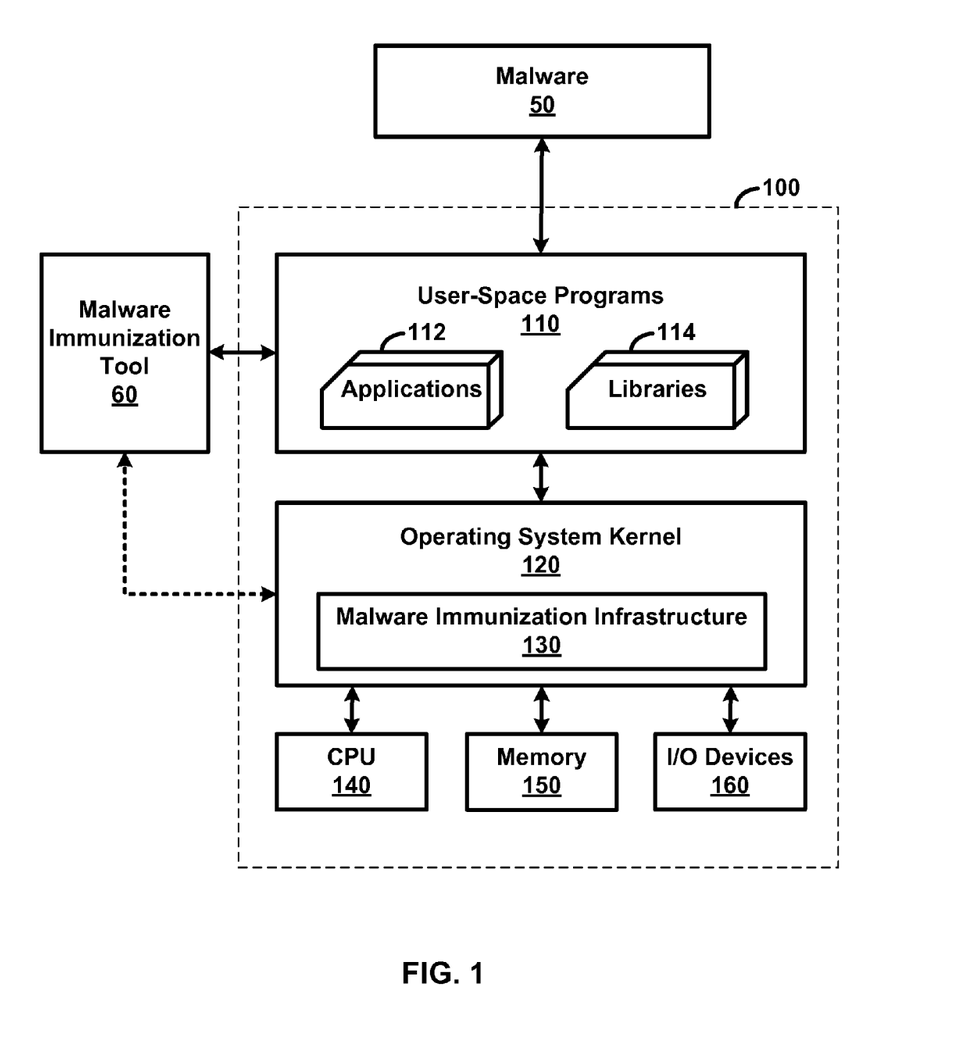
FIG. 1 is a system diagram illustrating an example computer system according to one or more embodiments of the present invention.

FIG. 1 is a system diagram illustrating an example computer system according to one or more embodiments of the present invention. As shown, the computer system 100 may include user-space programs 110, an operating system kernel 120, and various hardware components, such as a central processing unit 140, memory 150, and input/output (I/O) devices 160. It will be appreciated that the CPU 140 is shown as a single unit for illustration purposes only, and may include one or multiple CPUs. Further, each CPU may be a single-core processor or a multi-core processor that combines two or more independent processing cores. Example I/O devices 160 may include hard disks, keyboards, computer mice, printers, displays, etc.

The operating system kernel 120 generally refers to the component of many computer operating systems that acts as a bridge between software programs and the physical data processing performed at the hardware level. Responsibilities of the operating system kernel 120 may include managing the computer system's 100 resources as well as the communication between hardware and software. For example, the operating system kernel 120 may manage the user-space programs' 110 access to the CPU 140, memory 150, and I/O devices 160 through various functions and/or system calls.

The memory 150 may be used to store both program instructions and data, and may be divided by the operating system kernel 120 into both "kernel space" and "user space." Kernel space includes memory that may be used for running the operating system kernel 120, kernel extensions, and/or some device drivers, but is not usually made accessible to the user-space programs 110. User space includes memory that may be set up by the operating system kernel 120 for operating a user's context of execution, processes, threads, etc.

The user-space programs 110 may include various types of programs, such as applications 112 and libraries 114. The libraries 114 may include a variety of function calls, for example, which may invoke one or more system calls and may be shared among the applications 112. This sharing may allow multiple processes or threads from the applications 112 to use a common, single copy of a given library function during execution to avoid unnecessary duplication of code stored in the memory 150 at run-time.

As is further illustrated in FIG. 1, the computer system 100 may be exposed to one or more types of malware 50, such as viruses, worms, botnets, rootkits, trojans, spyware, keyloggers, etc., that may attempt to access the computer system 100 through the user-space programs 110. To protect against malicious actions of the malware 50, the user-space programs 110 may be specially instrumented, according to various techniques disclosed herein, by a malware immunization tool 60 such that a malware immunization infrastructure 130 operated by the operating system kernel 120 may verify the execution integrity of s given user-space program 110 before granting it control of the CPU 140, memory 150, I/O devices 160, etc.

For illustration purposes, the malware immunization infrastructure 130 is shown as a component of the operating system kernel 120. However, it will be appreciated that the malware immunization infrastructure 130 may be implemented in other embodiments as an entirely separate entity from the operating system kernel 120. In still other embodiments, the operating system kernel 120 may entirely subsume the operations of the malware immunization infrastructure 130. For example, the operating system kernel 120 may be specially instrumented to perform the operations otherwise attributed herein to the malware immunization infrastructure 130.

Similarly, the malware immunization tool 60 is shown for illustration purposes as being separate from the computer system 100. However, in general, the malware immunization tool 60 may be separate from or integral to the computer system 100, and may be operated independently or at the direction of the operating system kernel 120, as shown by the dashed line in FIG. 1. In some embodiments, the malware immunization tool 60 may be located remotely from the computer system 100 and be implemented as, or operated by, a separate computer system (not shown). In some embodiments, the malware immunization tool 60 may be implemented as, or otherwise include, a user level utility, such as a compiler.

Figure 2:
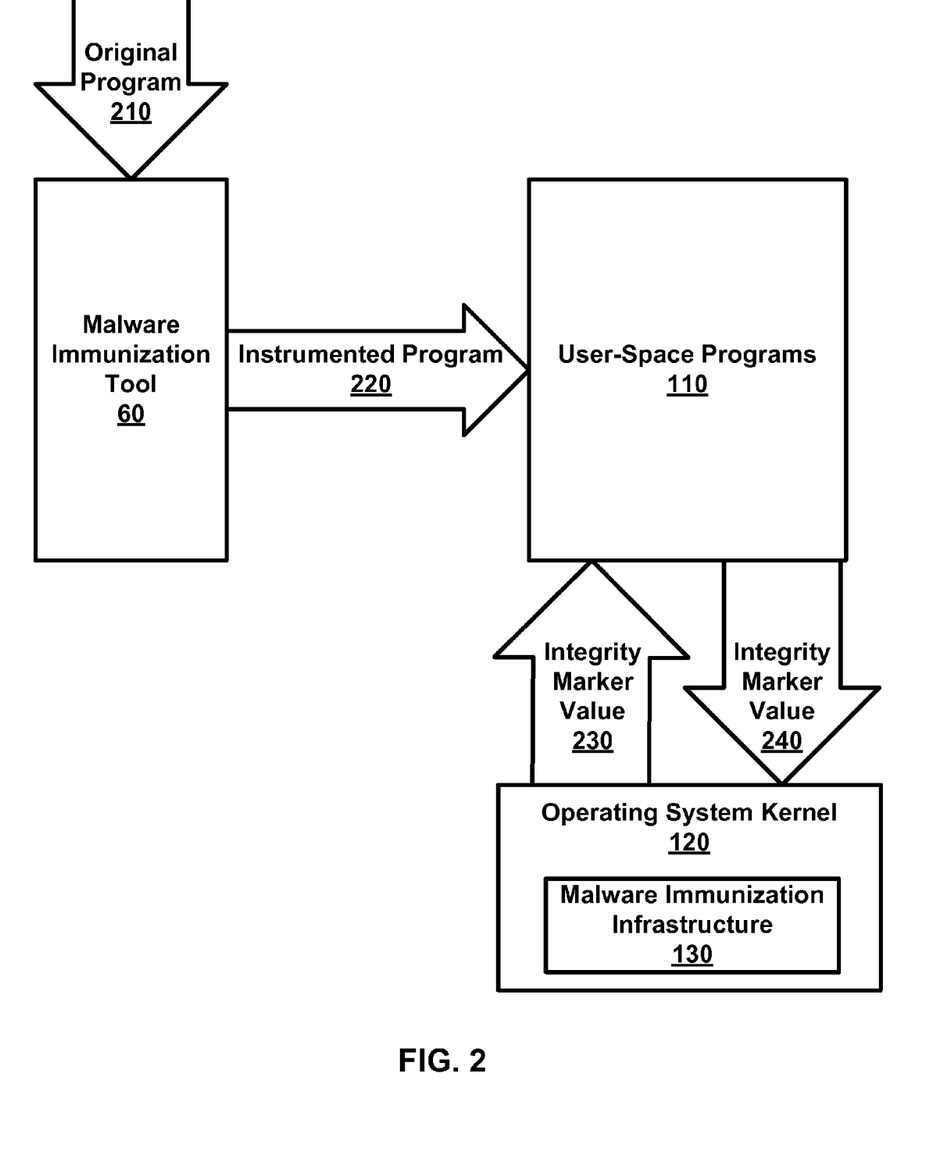
FIG. 2 is a flow diagram providing a basic overview of an example program execution integrity verification procedure using a malware immunization tool and a malware immunization infrastructure according to one or more embodiments.

FIG. 2 is a flow diagram providing a basic overview of an example program execution integrity verification procedure using the malware immunization tool 60 and the malware immunization infrastructure 130 according to one or more embodiments. In the illustrated example, the malware immunization tool 60 produces an instrumented program 220 from an original program 210 that is modified, as described herein, to protect it against various control flow hijacking attacks that may be mounted by the malware 50, such as buffer overflow attacks, return-to-libc attacks, return-oriented exploits, etc., in an attempt to gain access to the CPU 140, memory 150, I/O devices 160, etc. The instrumented program 220 may then be stored among the user-space programs 110 for operation on the computer system 100.

As will be described below in more detail, the malware immunization infrastructure 130 may subsequently exchange one or more integrity marker values 230, 240 with the instrumented program 220 during execution to verify its integrity before granting it control of the CPU 140, memory 150, I/O devices 160, etc.

Program Instrumentation

Figure 3:
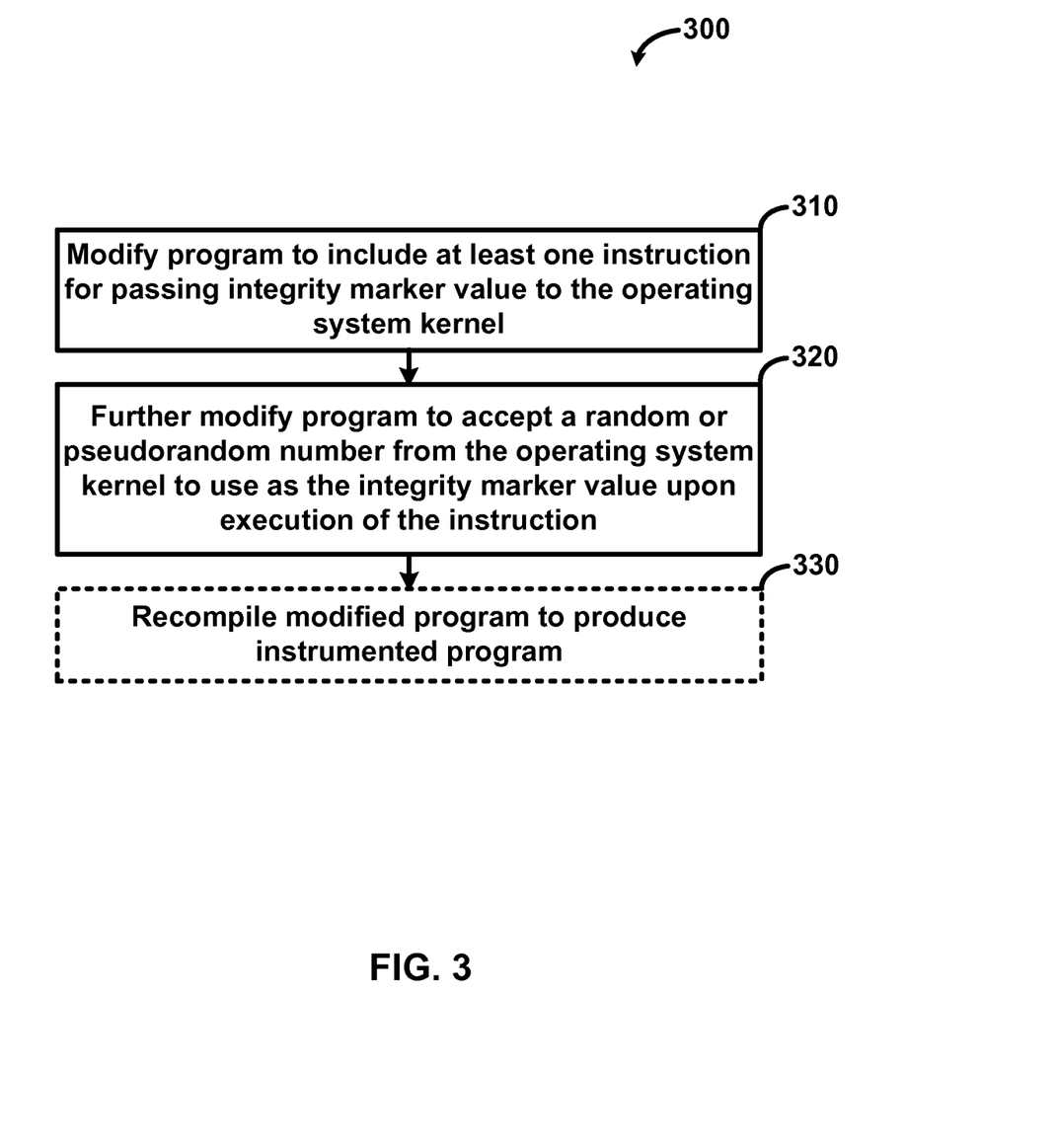
FIG. 3 is a flow diagram illustrating an example procedure for a malware immunization tool to instrument a program from an original program according to one or more embodiments.

FIG. 3 is a flow diagram illustrating an example procedure 300 for the malware immunization tool 60 to instrument a program from an original program according to one or more embodiments. In this example, the malware immunization tool 60 modifies an original program (e.g., the original program 210) to include at least one instruction for passing an integrity marker value to the operating system kernel 120 during execution of the instruction (block 310) for run-time verification of program execution integrity by the malware immunization infrastructure 130. Modifying the program may include modifying at least one existing instruction of the program or adding at least one new instruction to the program. The modified or added instruction may be, for example, made part of a system call requesting access to one or more resources of the computer system 100, such as control of the CPU 140, memory 150, I/O devices 160, etc.

The malware immunization tool 60 may further modify the original program to accept a given value (e.g., a random or pseudorandom number) from the operating system kernel 120 to use as the integrity marker value (block 320). In some embodiments, these modifications may be performed by a binary rewriting of the original program at the assembly code level. In other embodiments, these modifications may be performed at the source code level, and may require the program to be recompiled to produce an instrumented program (e.g., the instrumented program 220) (block 330). It will be appreciated that any suitable mechanism for modifying the original program may be employed.

Figure 4:
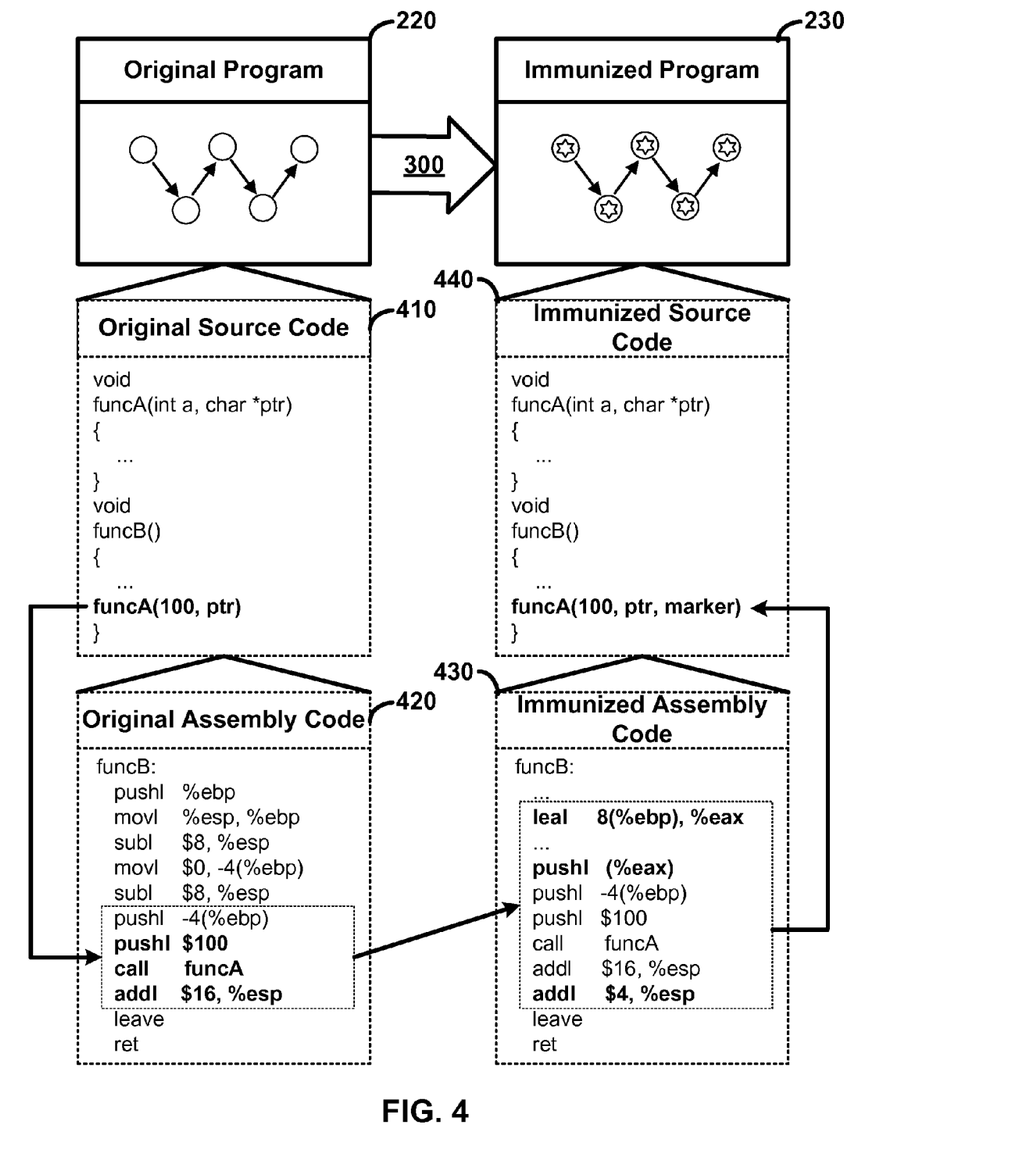
FIG. 4 illustrates an example modification of an original program at the assembly code level to instrument a program according to one or more embodiments.

FIG. 4 illustrates an example modification of an original program at the assembly code level to instrument a program according to one or more embodiments. As shown, the original program (e.g., the original program 210) includes original assembly code 420 that corresponds to original source code 410. The original assembly code 420 includes various instructions that may correspond to various functions in the original source code 410. In the illustrated example, the original source code 410 includes, among other elements, an example function (funcA') nested inside a parent function (funcB') and accepting one or more parameters.

The example function funcA may in some embodiments correspond to a system call, for example, such as a 'write' function accepting a given value (e.g., '100') desired to be written to the memory 150 at a desired location identified by a location pointer ('ptr'). Other example system calls may include 'open' functions, 'read' functions, 'close' functions, 'wait' functions, 'exec' functions, 'fork' functions, 'exit' functions, 'kill' functions, etc. When funcA is called, various supporting instructions in the original assembly code 420 (e.g., 'push' and/or 'add' instructions) may be executed for pushing corresponding values to the top of the program's stack (identified by the pointer 'esp') and otherwise executing the function.

The original assembly code 420 is instrumented by the malware immunization tool 60 to produce immunized assembly code 430. As shown, the immunized assembly code 430 may include one or more additional or modified instructions (e.g., 'lea', 'push', and/or 'add' instructions) for locating an integrity marker value ('eax') provided by the operating system kernel 120 and passing it back to the operating system kernel 120 when funcA is called. In this way, the integrity marker value may be passed to the operating system kernel 120 as if it was an additional parameter of funcA, for example, as shown in the corresponding immunized source code 440.

It will be appreciated, however, that modifications to the actual source code are not required. In some designs, the original source code 410 may not be accessible to the malware immunization tool 60. Regardless, instrumentation of the original program 210 may be performed at the binary level without access to the original source code 410. The instrumented program 220 may therefore operate as if its source code has been modified to include the integrity marker value as shown in the immunized source code 440, even if access to the original source code 410 is not available or otherwise feasible.

The above-described instrumentation may accordingly be made effectively transparent to the user. For example, in the C programming language, the integrity marker value may be implicitly passed as the rightmost parameter of the example function funcA, in addition to any other existing parameters.

Because the default C language function calling convention passes parameters from right to left, which inherently supports a variable number of parameters, passing the integrity marker value as an extra implicit rightmost parameter to C language function calls does not change the original semantics of the function.

However, in some embodiments, it may be desirable to provide an additional indicator to the operating system kernel 120 to specifically identify the location of the integrity marker value. For example, for functions that natively accept and pass a variable number of parameters (e.g., the 'printf' function), a canary may be used as an indicator of the location of the integrity marker value among the original parameters. The canary word may be randomly chosen by the malware instrumentation tool 60, for example, and different programs may be instrumented with different canary words.

It will of course be appreciated that the example code illustrated in FIG. 4 is presented in the C programming language by way of example only, and that other programming languages may be used in other embodiments.

Further, it will also be appreciated that the specific mechanism in the example of FIG. 4 for passing the integrity marker value to the operating system kernel 120 as an additional parameter is also provided merely as an example, and that any mechanism for passing the integrity marker value to the operating system kernel 120 may be used. For example, the system call number itself may be modified to include the integrity marker value in some embodiments.

Figure 5:
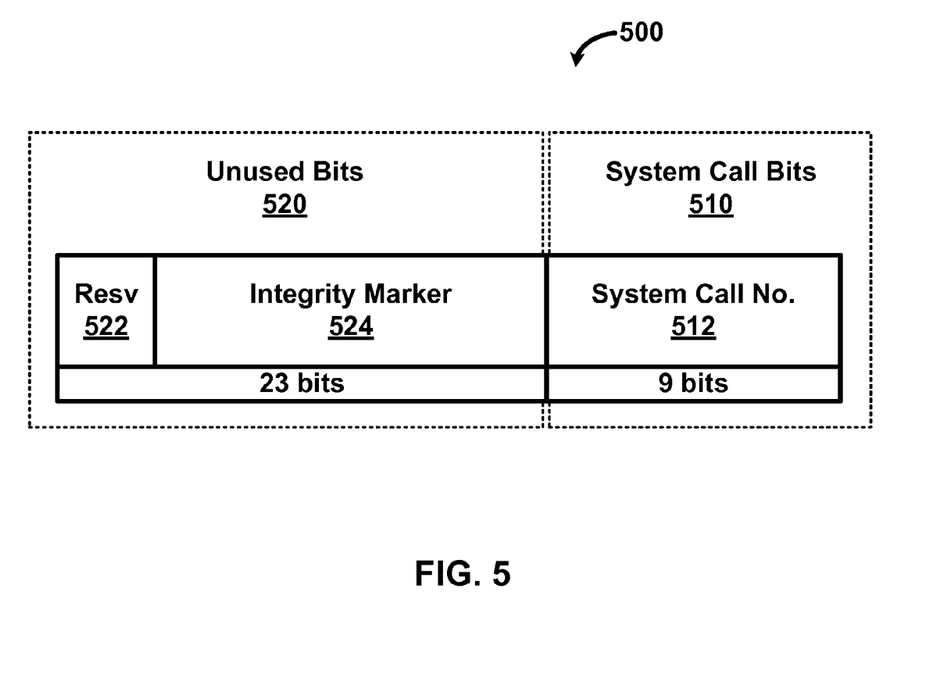
FIG. 5 illustrates an example modification of a system call number according to one or more embodiments.

FIG. 5 illustrates an example modification of a system call number according to one or more embodiments. Although many operating systems provide hundreds of system calls, the relatively large 32-bit or even 64-bit number schemes used by modern system architectures provide a number of unused bits in the system call number itself that may be used to pass the integrity marker value to the operating system kernel 120. For example, the Linux operating systems typically have just over 300 different system calls. Thus, in a 32-bit system, for example, a 9-bit system call number field would accommodate 512 unique system calls. This is more than enough to cover the 300 system calls, and still leaves space for a 23-bit integrity marker value with more than 8 million possible values.

In the illustrated example of FIG. 5, a modified system call number 500 for an example 32-bit operating system includes a 9-bit wide system call number field 510 and a 23-bit wide collection of previously unused bits 520. The previously unused bits 520 may be used to carry a new integrity marker field 524. The previously unused bits 520 may also retain one or more reserved bits 522 as well, if the desired length of the integrity marker field 524 is selected to be shorter than the total number of unused bits 520.

Accordingly, the integrity marker field 524 may be passed to the operating system kernel 120 as part of the system call number 500 when the call is invoked, as discussed above, and may be configured to carry the particular integrity marker value assigned to the invoking program. It will be appreciated that the number and arrangement of bits shown in FIG. 5 is for illustration purposes only, and may take any other form acceptable to the particular operating system or computer architecture being employed.

It will also be appreciated that in some embodiments, programs may not invoke system calls directly. Instead, libraries of functions may be used, such as an implementation of the C library (libc), to avoid loading redundant copies of the same library function code into memory at run-time. For example, with reference back to FIG. 1, some of the applications 112 may invoke certain functions, including system calls, through function calls provided by one or more of the libraries 114. Although convenient and common, this design may allow malware to access operating system services (e.g., open a shell) under certain circumstances without actually injecting any malicious code. This is sometimes referred to as a "return-to-libc" attack.

Figure 6:
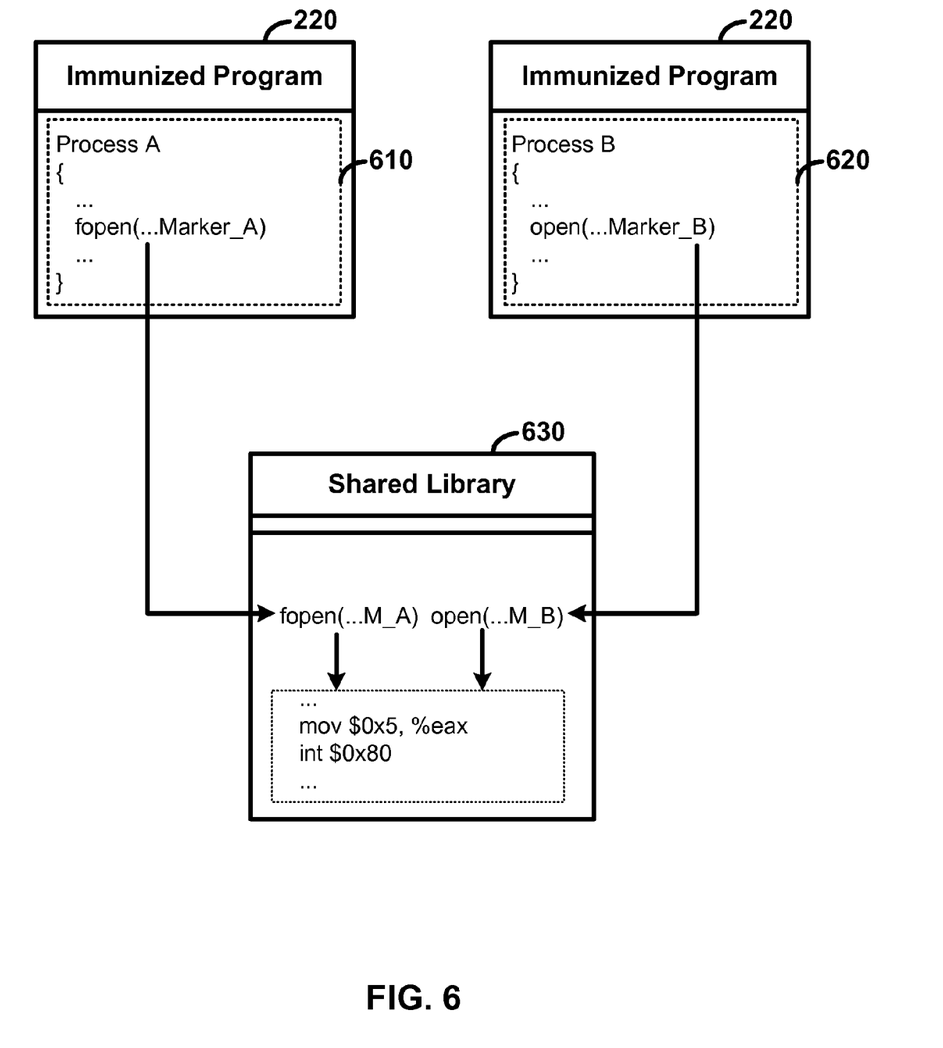
FIG. 6 illustrates the immunization of multiple instances of a given program that share a common library of function calls according to one or more embodiments.

FIG. 6 illustrates the immunization of multiple instances of a given program that share a common library of function calls according to one or more embodiments. In this example, a first instance 610 ("Process A") of the instrumented program 220 and a second instance 620 ("Process B") of the instrumented program 220 share a common library 630 of function calls. Among other functions, the first instance 610 of the instrumented program 220 may execute a file open function ('fopen') and the second instance 620 of the instrumented program 220 may execute a separate open function (open). The shared library 630 may include shared library functions fopen( ) and open( ), such as those for system call number '5' in Linux.

As shown, each instance 610, 620 of the instrumented program 220 may be instantiated with its own integrity marker value. In the illustrated example, the first instance 610 of the instrumented program 220 is instantiated with a corresponding integrity marker value 'Marker_A' while the second instance 620 of the instrumented program 220 is instantiated with a corresponding integrity marker value 'Marker_B'. Upon execution of their respective functions, each instance 610, 620 of the instrumented program 220 may insert its corresponding integrity marker value into its called function. This allows the malware immunization infrastructure 130 to reliably determine if the initiating entity of the function call is a valid program or is instead malware, even if the function call is invoked via shared library functions.

Program Verification

Once a program has been instrumented according to one or more of the various techniques described herein, its execution may be subsequently verified by the malware immunization infrastructure 130 as being valid or trustworthy, rather than compromised by malware.

Figure 7:
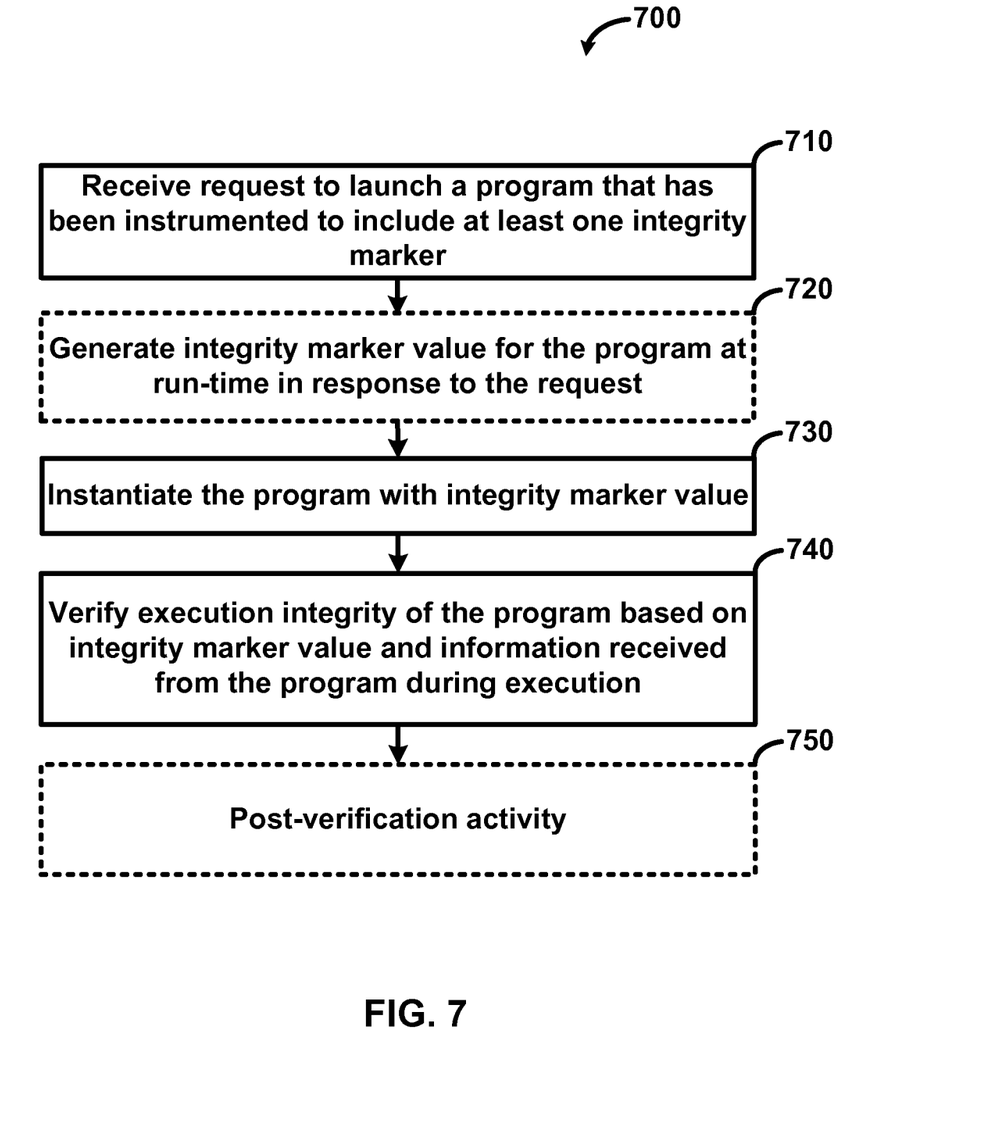
FIG. 7 is a flow diagram illustrating an example procedure for a malware immunization infrastructure to verify program execution integrity according to one or more embodiments.

FIG. 7 is a flow diagram illustrating an example procedure 700 for the malware immunization infrastructure 130 to verify program execution integrity according to one or more embodiments. Process 700 begins at the point where the operating system kernel 120 receives a request to launch a program that has been instrumented to include at least one integrity marker, such as the instrumented program 220 discussed above (block 710).

In some embodiments, the operating system kernel 120 may specifically generate an integrity marker value for the program at run-time in response to the request (block 720). For example, the operating system kernel 120 may generate the integrity marker value by generating a random or pseudorandom number to uniquely identify each instance (e.g., process or thread) of the program. Any known technique for generating the random or pseudorandom number may be used, such as a Naor-Reingold pseudorandom function, a Park-Miller random number generator, linear feedback shift registers, or others known in the art. However, in other embodiments, a static value may be used for integrity marker value. In either case, the integrity marker value may be stored (e.g., at a given location in the memory 150) for future reference by the malware immunization infrastructure 130.

The operating system kernel 120 may instantiate the program with the integrity marker value (block 730), and verify the execution integrity of the program using the malware immunization infrastructure 130 based on the integrity marker value and any information received from the program during execution (block 740). Based on whether the program's integrity is verified or not, and whether subsequent processing is enabled, the operating system kernel 120 may perform various post-verification activity (block 750), such as "malware forensics" operations. Such malware forensics capabilities may allow the malware immunization infrastructure 130 to accurately locate and/or monitor certain malicious activity of the malware 50.

Figure 8:
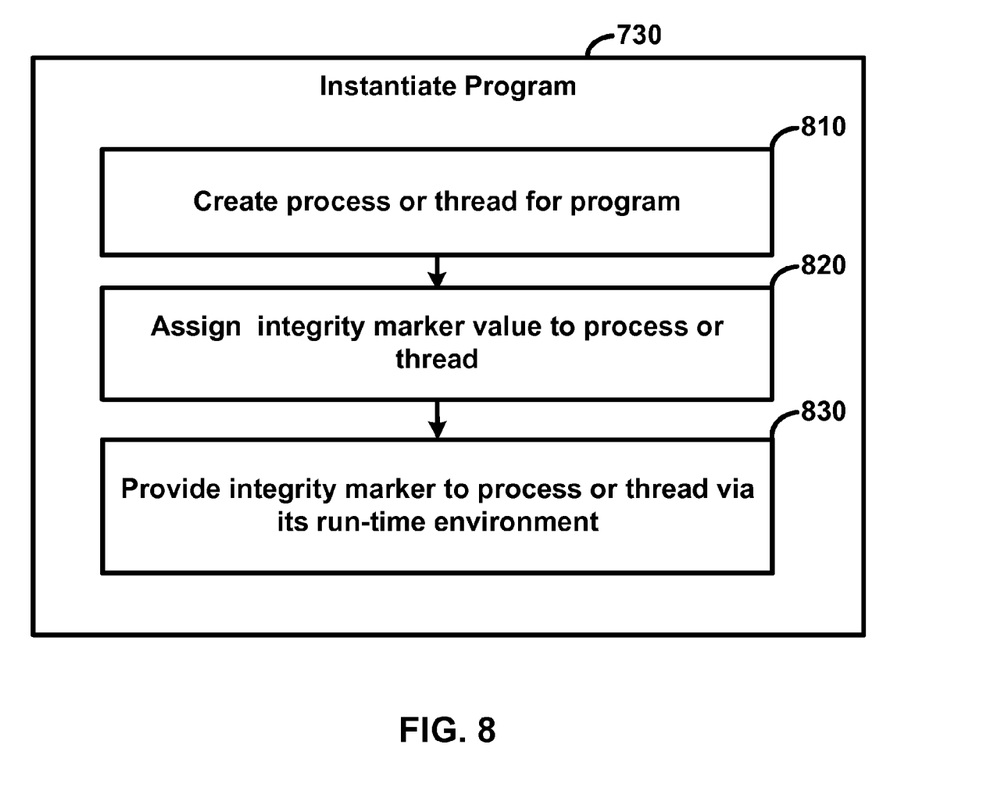
FIG. 8 illustrates an example procedure for instantiating the program with the integrity marker value according to one or more embodiments.

FIG. 8 illustrates an example procedure for instantiating the program with the integrity marker value according to one or more embodiments. In this example, instantiating the program (block 730) may include creating a process or thread for the program (block 810), assigning the integrity marker value to the process or thread (820), and providing the integrity marker value to the process or thread, such as by placing it into the process' run-time environment (830). It will be appreciated, however, that any suitable mechanism for launching the program and identifying the appropriate integrity marker value for the program to use may be employed. In some embodiments, the appropriate integrity marker value for the program to use may be pre-programmed such that the program and the malware immunization infrastructure 130 know a priori which value will be used for a given process or thread.

Figure 9:
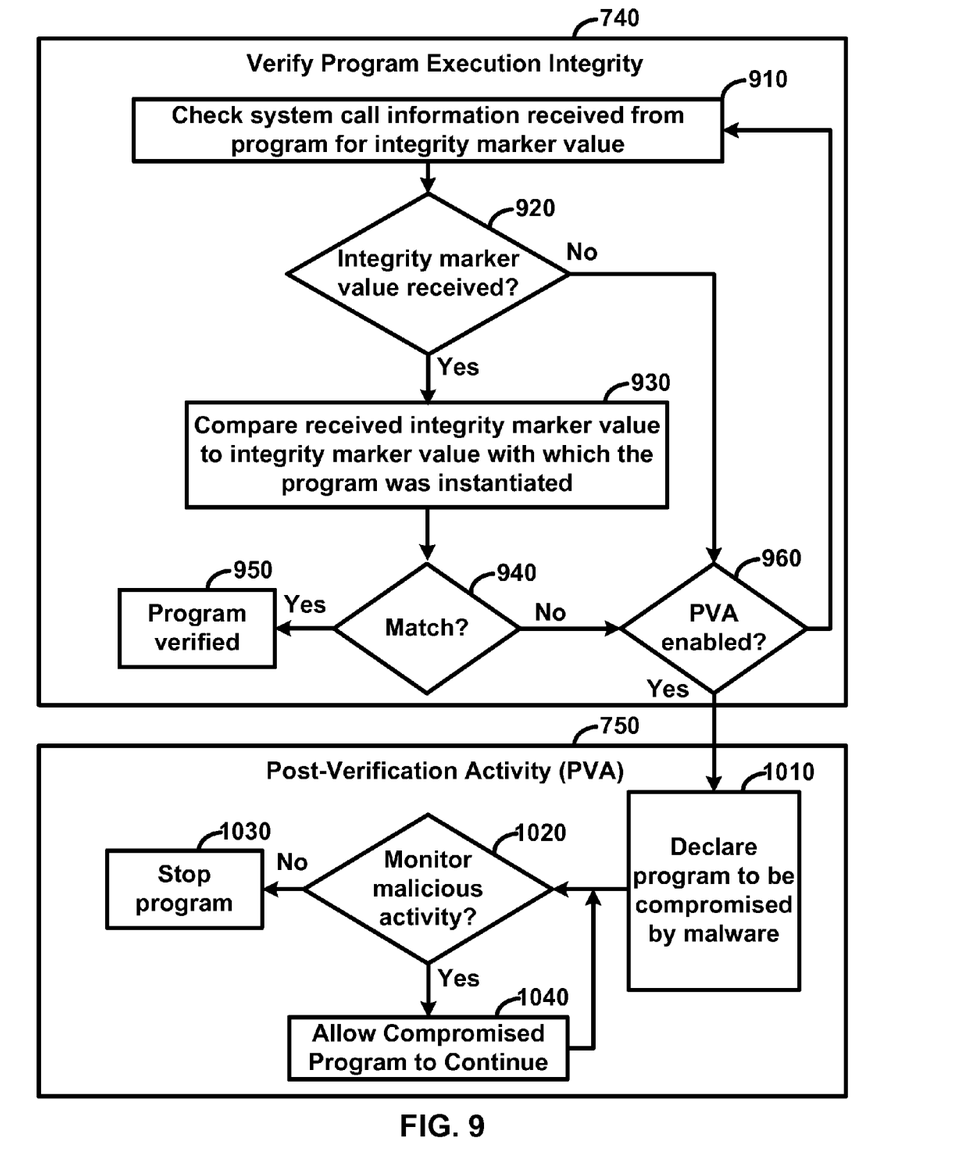
FIG. 9 illustrates an example procedure for verifying the execution integrity of the program based on the integrity marker value and information received from the program during execution, and for performing various post-verification activity according to one or more embodiments.

FIG. 9 illustrates an example procedure for verifying the execution integrity of the program based on the integrity marker value and information received from the program during execution (block 740), and for performing various post-verification activity (block 750) according to one or more embodiments. In this example, the operating system kernel 120 uses the malware immunization infrastructure 130 to check the information received from the program for an integrity marker value that matches the integrity marker value with which the program was instantiated (block 910). Checking the information may include extracting the received information from a system call or other function executed by the program, for example.

If the information received from the program includes an integrity marker value ('yes' at decision 920), the malware immunization infrastructure 130 may compare the received integrity marker value to the integrity marker value with which the program was instantiated (block 930). If the information received from the program includes an integrity marker value that matches the integrity marker value with which the program was instantiated (yes' at decision 940), the malware immunization infrastructure 130 may declare that the program is verified (block 950). It will be appreciated that a "match" may not be identical to the original or generated value. For example, the original integrity marker value with which the program was instantiated may be further processed in an agreed upon manner by both the operating system kernel 120 and the instrumented program, as a further security measure.

Otherwise, if the information received from the program does not include an integrity marker value ('no' at decision 920), or it includes an integrity marker value that does not match the integrity marker value with which the program was instantiated (no' at decision 940), the malware immunization infrastructure 130 may refrain from declaring that the program is verified and instead determine whether any post-verification activity (PVA) is warranted (decision 960).

In some situations, it may be desirable for the malware immunization infrastructure 130 to perform one or more post-verification operations, while in other situations it may be desirable for the malware immunization infrastructure 130 to disable such post-verification operations, at least for a period of time. For example, it has been found that a newly instantiated process or thread may in some situations not be able to immediately locate the appropriate integrity marker value placed into the program's run-time environment and use it for first few system calls. Thus, in some embodiments, determining whether any post-verification activity is warranted (decision 960) may include checking a flag maintained by the malware immunization infrastructure 130 (e.g., at a given memory location within the memory 150) to indicate whether post-verification activity is yet appropriate. The flag may be set, for example, based on whether the information received from the program in the past has included at least one integrity marker value that matched the integrity marker value with which the program was instantiated (i.e., at least one 'yes' at decision 940). The reception of at least one matching integrity marker value may act as a trigger to enable the flag, thereby providing a grace period for the program to locate the appropriate integrity marker value and prevent the malware immunization infrastructure 130 from declaring the program to be compromised by malware until it is clear that the program has located the appropriate integrity marker value, such that false positives may be reduced or eliminated.

If post-verification activity is not enabled ('no' at decision 960), no further action is taken and the malware immunization infrastructure 130 returns to checking subsequent system call information (block 910). If post-verification activity is in fact enabled ('yes' at decision 960), and the current information received from the program does not include an integrity marker value ('no' at decision 920) or includes an integrity marker value that does not match the integrity marker value with which the program was instantiated ('no' at decision 940), the malware immunization infrastructure 130 may declare the program to be compromised by malware (block 1010).

The malware immunization infrastructure 130 may decide whether to continue the compromised program and monitor it for any malicious activity (decision 1020). This may be referred to as "malware forensics," and may be useful in determining how the identified malware operates. If the malware immunization infrastructure 130 does not desire to monitor the compromised program for subsequent malicious activity ('no' at decision 1020), the operating system kernel 120 may simply stop the compromised program (block 1030). Otherwise, if the malware immunization infrastructure 130 does desire to monitor the compromised program for subsequent malicious activity ('yes' at decision 1020), the operating system kernel 120 may allow the compromised program to continue as long as desired (block 1040). In some embodiments, a user level utility may be employed to allow a user of the computer system 100 to inform the malware immunization infrastructure 130 about which processes or threads it should check for the integrity marker value, and what steps should be taken once a compromised program is detected.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. The software routine(s) may be initially stored in a computer-readable medium, and loaded and executed by a processor. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example of an operating system oriented computing system. However, one skilled in the art will recognize that embodiments of the invention could be any computing system subject to attacks by malware.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of program instrumentation employing a computer system including at least one processor, the method comprising the computer system modifying a user-space program that is not part of an operating system kernel to include at least one instruction for passing an integrity marker value from the user-space program to the operating system kernel during execution of the at least one instruction;

the computer system modifying the user-space program to accept a random or pseudorandom number from the operating system kernel to use as the integrity marker value upon execution of the at least one instruction, the random or pseudorandom number being passed back to the operating system kernel during execution of the at least one instruction to verify program execution integrity; and making the at least one instruction part of at least one system call included in the user-space program to request access to one or more resources of the computer system; wherein the at least one system call comprises a system call number that is modified to include the integrity marker value.

2. The method of claim 1, wherein the modifying of the user-space program comprises modifying at least one existing instruction of the user-space program or adding at least one new instruction to the user-space program to pass the integrity marker value to the operating system kernel during execution of the at least one existing instruction or the at least one new instruction.

3. The method of claim 1, wherein the one or more resources includes at least one of a CPU, a memory, and I/O devices, and wherein the requested access includes at least one of control of the CPU, control of the memory, and control of the I/O devices.

4. The method of claim 1, wherein the making the at least one instruction part of the at least one system call includes making the at least one instruction part of every system call included in the user-space program.

5. An apparatus for program instrumentation, the apparatus comprising:

at least one processor configured to modify a user-space program that is not part of an operating system kernel to include at least one instruction for passing an integrity marker value from the user-space program to the operating system kernel during execution of the at least one instruction, to modify the user-space program to accept a random or pseudorandom number from the operating system kernel to use as the integrity marker value upon execution of the at least one instruction, the random or pseudorandom number being passed back to the operating system kernel during execution of the at least one instruction to verify program execution integrity;

and to make the at least one instruction part of at least one system call included in the user-space program to request access to one or more resources of the computer system; and at least one non-transitory storage medium coupled to the at least one processor and configured to store the user-space program; wherein the at least one system call comprises a system call number that is modified to include the integrity marker value.

6. The apparatus of claim 5, wherein the modifying of the user-space program comprises modifying at least one existing instruction of the user-space program or adding at least one new instruction to the user-space program to pass the integrity marker value to the operating system kernel during execution of the at least one existing instruction or the at least one new instruction.

7. The apparatus of claim 5, wherein the one or more resources includes at least one of a CPU, a memory, and I/O devices, and wherein the requested access includes at least one of control of the CPU, control of the memory, and control of the I/O devices.

8. The apparatus of claim 5, wherein the at least one processor is configured to make the at least one instruction part of every system call included in the user-space program.

\* \* \* \* \*